United States Patent
Totale et al.

(10) Patent No.: US 11,016,646 B1
(45) Date of Patent: May 25, 2021

(54) METHOD AND MECHANISM FOR CONTEXT DRIVEN ALTERATION OF UI ARTIFACTS INSTANCES BEHAVIOR USING EXPRESSION BASED PLUGGABLE UI ASPECTS

(71) Applicant: Open Text Corporation, Waterloo (CA)

(72) Inventors: Sachin G. Totale, Pleasanton, CA (US); Samir Yasin Vaidya, Bangalore (IN)

(73) Assignee: Open Text Corporation, Waterloo (CA)

(*) Notice: Subject to any disclaimer, the term of this patent is extended or adjusted under 35 U.S.C. 154(b) by 717 days.

(21) Appl. No.: 15/077,184

(22) Filed: Mar. 22, 2016

(51) Int. Cl.
G06F 3/0484 (2013.01)
G06F 8/656 (2018.01)
G06F 9/451 (2018.01)
G06F 3/0482 (2013.01)

(52) U.S. Cl.
CPC ........ G06F 3/04847 (2013.01); G06F 3/0482 (2013.01); G06F 3/04842 (2013.01); G06F 8/656 (2018.02); G06F 9/451 (2018.02)

(58) Field of Classification Search
CPC .... G06F 3/04847; G06F 9/451; G06F 3/0482; G06F 3/04842
See application file for complete search history.

(56) References Cited

U.S. PATENT DOCUMENTS

| | | | | |
|---|---|---|---|---|
| 5,844,554 A | * | 12/1998 | Geller | G06F 8/34 715/744 |
| 7,216,298 B1 | * | 5/2007 | Ballard | G06F 16/9577 715/760 |
| 7,281,018 B1 | * | 10/2007 | Begun | G06F 40/117 |
| 8,819,620 B1 | * | 8/2014 | Volchegursky | G06F 8/35 717/105 |
| 2003/0172193 A1 | * | 9/2003 | Olsen | G06F 8/38 719/315 |
| 2005/0257157 A1 | * | 11/2005 | Gilboa | G06F 8/38 715/747 |
| 2005/0257210 A1 | * | 11/2005 | Stienhans | G06F 8/65 717/170 |
| 2006/0036745 A1 | * | 2/2006 | Stienhans | G06F 8/38 709/228 |
| 2006/0075382 A1 | * | 4/2006 | Shaburov | G06F 8/34 717/106 |
| 2007/0079286 A1 | * | 4/2007 | Cook | G06F 16/94 717/113 |

(Continued)

*Primary Examiner* — Arpan P. Savla
*Assistant Examiner* — Linda Huynh
(74) *Attorney, Agent, or Firm* — Sprinkle IP Law Group

(57) ABSTRACT

A selection of a user interface artifact from a set of one or more user interface artifacts associated with a first user interface to an enterprise content management system is received. A selection of a user interface aspect from a set of one or more user interface aspects is received. Each user interface aspect in the set of user interface aspects is capable of modifying at least one user interface artifact from the set of user interface artifact. A second user interface to the enterprise content management system is generated using the selected user interface artifact and the selected user interface aspect where the selected user interface artifact in the second user interface is implemented per the selected user interface aspect.

16 Claims, 20 Drawing Sheets

(56) References Cited

U.S. PATENT DOCUMENTS

| | | | |
|---|---|---|---|
| 2007/0276689 A1* | 11/2007 | Slone | G06F 8/38 717/109 |
| 2009/0006454 A1* | 1/2009 | Zarzar | G06F 17/2247 |
| 2010/0262902 A1* | 10/2010 | Burns | G06F 8/38 715/234 |
| 2011/0145748 A1* | 6/2011 | Farver | G06F 16/9024 715/771 |
| 2014/0129924 A1* | 5/2014 | Le Bescond de Coatpont | G06F 17/248 715/234 |
| 2014/0229846 A1* | 8/2014 | Abaya | G06F 3/0481 715/744 |
| 2014/0244784 A1* | 8/2014 | Jaskiewicz | H04L 67/306 709/217 |
| 2014/0380272 A1* | 12/2014 | Hertweck | G06F 11/3664 717/113 |
| 2015/0261506 A1* | 9/2015 | Torgemane | H04N 21/4312 717/107 |
| 2015/0331596 A1* | 11/2015 | Yu | G06Q 10/063 715/762 |

* cited by examiner

METHOD AND MECHANISM FOR CONTEXT DRIVEN ALTERATION OF UI ARTIFACTS INSTANCES BEHAVIOR USING EXPRESSION BASED PLUGGABLE UI ASPECTS

BACKGROUND OF THE INVENTION

Enterprise content management systems, such as EMC Documentum, enable enterprise users (e.g., companies) to manage content according to their business processes and/or some content lifecycle. For example, suppose a company uses EMC Documentum to create and manage some product over its lifecycle (e.g., from manufacturing or acquisition to distribution or sale). A user interface associated with the enterprise content management system may be created to ensure that the company's business process are followed, for example to ensure that the proper people authorize various steps, only authorized users have access to certain (e.g., sensitive or proprietary) information, etc.

To assist in the creation and management of user interfaces for enterprise content management systems, some enterprise content management vendors provide application composition tools. For example, EMC provides the xCP Designer application composer. It would be desirable if application composition tools had new ways to generate user interfaces, for example when it comes time to update an existing user interface. Existing techniques may be risky and/or require a level of expertise that some users may not have.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
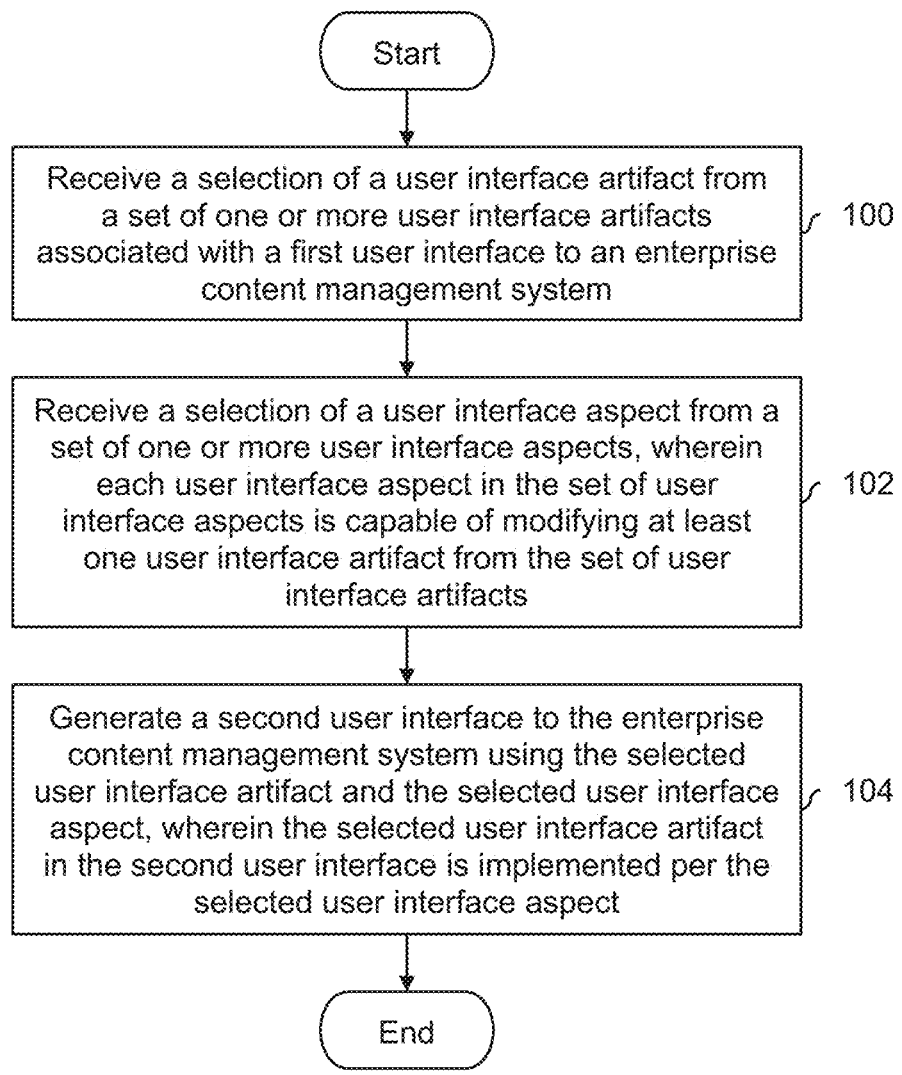
FIG. 1 is a flowchart illustrating an embodiment of a process for generating a user interface to an enterprise content management system.

FIG. 1 is a flowchart illustrating an embodiment of a process for generating a user interface to an enterprise content management system. In some embodiments, the process of FIG. 1 is performed by an application composition tool (e.g., EMC xCP Designer) which generates user interfaces to an enterprise content management system (e.g., EMC Documentum).

At 100, a selection of a user interface artifact from a set of one or more user interface artifacts associated with a first user interface to an enterprise content management system is received. Conceptually, the first user interface (recited by step 100) may be thought of as an initial or original user interface and the second user interface (recited by step 104) may be thought of as a modified user interface. In one example of step 100, a user interface designer may select (e.g., using an application composition tool) a user interface artifact (s)he wants modified.

As used herein, the term user interface artifact (or, more simply, artifact) refers to a smaller part or piece of a user interface which defines how the user interface behaves (e.g., in response to a user's input or interactions) and/or is rendered or otherwise displayed. To put it another way, a user interface is a collection of visual or display elements which are displayed, as well as a collection of actions, step, or processes which are performed (e.g., when in a certain state or when certain conditions have been met) and (generally speaking) a user interface artifact is a smaller piece of the user interface which describes some slice of how the user interface behaves or is rendered/displayed. User interface artifacts include (but are not limited to): user interface widgets (e.g., a date input widget, a text input widget, an actionable widget (e.g., a button), actions, user interface events, context menus, page fragments, action flows, pages, and steps. More detailed examples of user interface artifacts are described below.

At 102, a selection of a user interface aspect from a set of one or more user interface aspects is received, wherein each user interface aspect in the set of user interface aspects is capable of modifying at least one user interface artifact from the set of user interface artifacts. For brevity, user interface aspects are sometimes referred to herein as aspects. As in the above step, a user interface designer may select (e.g., in an application composition tool) which user interface aspect (s)he wants to use to modify the selected user interface artifact.

In some embodiments, the selected user interface aspect may be as simple as changing the text of a label (e.g., from English to some other language). Or, the selected user interface aspect may be associated with a more complicated change, such as changing a check or validation performed on an input. Some more detailed examples of user interface aspects are described in more detail below.

At 104, a second user interface to the enterprise content management system is generated using the selected user interface artifact and the selected user interface aspect, wherein the selected user interface artifact in the second user interface is implemented per the selected user interface aspect. For example, if the selected user interface aspect affects the placement of a particular widget, then the second user interface will have that widget placed per the selected user interface aspect (e.g., as opposed to some original placement).

In some embodiments, the process of FIG. 1 receives information in addition to the selection of the user interface artifact to be modified and the selection of the modifying user interface aspect. For example, if a label is being changed, then the new text that is to be displayed is received. Or, if some validation process (which is performed on some input) is changed to a different validation process, then some identification or specification of the new process is received. In some embodiments, an aspect is applied to (i.e., modifies) an artifact at runtime based on a conditional expression. For example, a dynamic label aspect may be used to change a label if some condition is met. Such a conditional expression is another example of an input that is received in addition to the selected user interface artifact and the selected user interface aspect.

The following figure shows an example of a system in which the process of FIG. 1 is performed.

Figure 2:
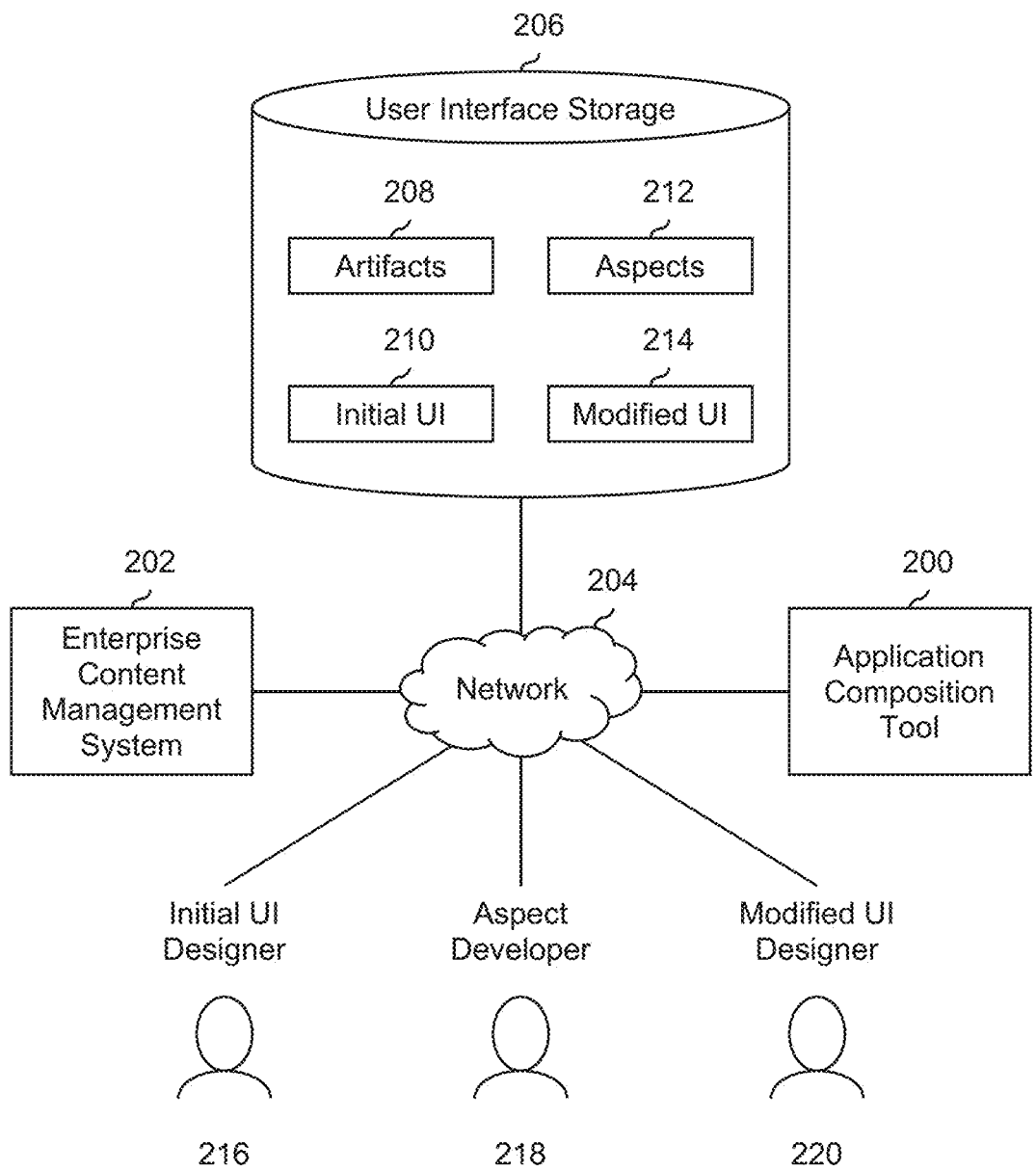
FIG. 2 is a diagram showing an embodiment of a system which includes an enterprise content management system.

FIG. 2 is a diagram showing an embodiment of a system which includes an enterprise content management system. In the example shown, application composition tool 200 is used to create user interfaces to enterprise content management system (202). In this particular example, application composition tool 200 runs on some server (not shown) and is accessible to user interface designers 216 and 220 and aspect developer 218 via network 204.

Initially, enterprise content management system 202 is empty and there is no user interface with which to access or otherwise manage information in enterprise content management system 202. Initial user interface designer 216 accesses application composition tool 200 in order to create an initial user interface to enterprise content management system 202. For simplicity and brevity, initial user interface designer 216 is shown as a single person, but naturally any number of people may be involved in developing the initial user interface.

Using application composition tool 200, initial user interface designer 216 generates artifacts 208 and initial user interface 210 which are stored in user interface storage 206. Generally speaking, artifacts 208 are the "building blocks" associated with initial user interface 210 and initial user interface 210 is generated from artifacts 208 (e.g., application composition tool 200 ingests artifacts 208 and outputs initial user interface 210). It is noted that artifacts 208 are not necessarily in a form that is capable of being executed or run, whereas initial user interface 210 is in a form which is capable of being executed or run. In one example, artifacts 208 are in XML and user interface 210 is in JavaScript (e.g., JSON).

Aspect developer 200 uses application composition tool 200 to generate aspects 212. (As before, for simplicity and brevity, aspect developer 218 is shown as a single person but any number of people may develop aspects.) Generally speaking, an aspect describes a change which (if desired or otherwise selected) is used to change some artifact. In some embodiments, each aspect includes a list of relevant or applicable artifacts which that aspect is permitted to modify (if desired). For example, an aspect developer may specify whether an aspect affects (only) user interface widgets versus (only) actions versus (only) user interface events, etc. In some embodiments, an artifact only affects a certain property or field associated with an artifact and that property or field is specified by the aspect developer. In some embodiments, an artifact requires some input and the aspect developer specifies such inputs and any limitations or constraints on that input (if appropriate).

Using the artifacts (208) created by initial user interface designer 216 and the aspects (212) created by aspect developer 218, modified user interface designer 220 picks which artifacts to modify and which aspects to apply (i.e., changes to make) using application composition tool 200. The user interface which results from those selections is modified user interface 214. As before, for simplicity and brevity, modified user interface designer 220 is shown as a single person but any number of people may develop aspects.

In one example of how the modified user interface 214 is generated, the application composition tool includes the selected aspect(s) in the applicable artifact's JSON. In some cases there may be multiple aspects which have been selected and which apply to the same artifact. If so, modified user interface 214 (at least in this example) puts each aspect in a separate node. During runtime, the JSON of each artifact is checked to see if any aspects modify that particular artifact. If so, the code from the aspect is used instead of the corresponding code from the artifact (e.g., code in the aspect which causes a new label to be displayed instead of corresponding label display code in the aspect). In some embodiments, there is some conditional expression which is evaluated at runtime and (based on whether or not the conditional expression is satisfied), the appropriate code is executed. In some embodiments (e.g., when the code associated with the aspect will always be executed and the corresponding code associated with the artifact will never be executed), the code associated with the aspect replaces or otherwise overwrites the corresponding code associated with the artifact.

A benefit to this technique is that a deep understanding of artifacts 208 and/or initial user interface 210 is not required. For example, many companies which employ an enterprise content management system have complex business processes which are enforced by the user interface to the enterprise content management system. Also, an enterprise content management system may have many types of data and/or data objects which may be related in a many different ways. As a result, directly modifying artifacts 208 in order to make a change to a user interface may be difficult and/or risky.

In contrast, with the system shown, neither aspect developer 218 nor modified user interface designer 220 need to have a deep understanding of artifacts 208 and/or initial user interface 210 in order to generate and use aspects 212, respectively. Aspect developer 218 may be a user interface or application expert (e.g., without necessarily having a deep understanding of the business process or rules enforced by initial user interface 210) who has enough knowledge to avoid making changes to any action, user interface event, actions flow, and/or step which may cause business rules or business process associated with initial user interface 210 to be violated. Similarly, modified user interface designer 220 may know about new features, behaviors, or appearances for modified user interface 214 and can make these changes using aspects 212 without being an expert coder and/or having a deep understanding of deep understanding of artifacts 208 and/or initial user interface 210.

As described above, another benefit to the technique described herein is that aspects can be created and made available while still enforcing and/or respecting business processes and/or rules already in place in initial user interface 210.

As described above, in some embodiments, each aspect includes a list of artifacts which that aspect is applicable to (i.e., is permitted to modify, if desired). The following figure shows an example of a process to determine applicable user interface aspects for a given user interface artifact.

Figure 3:
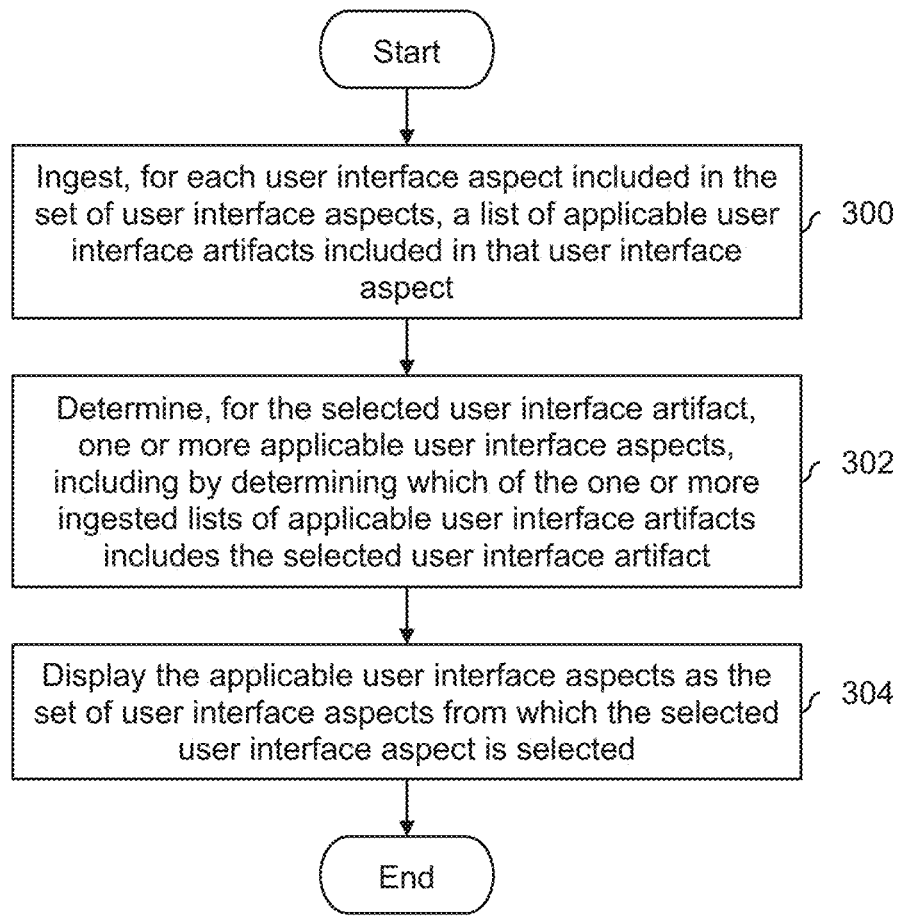
FIG. 3 is a diagram illustrating an embodiment of a process for determine applicable user interface aspects for a particular user interface artifact.

FIG. 3 is a diagram illustrating an embodiment of a process for determine applicable user interface aspects for a particular user interface artifact. In some embodiments, the process is performed between steps 100 and 102 in FIG. 1. Application composition tool 200 from FIG. 2 is an example of a system which may perform the process of FIG. 3.

At 300, for each user interface aspect included in the set of user interface aspects, a list of applicable user interface artifacts included in that user interface aspect is ingested. For example, application composition tool 200 would ingest aspects 212 in user interface storage 206 and each aspect may have an "applicable to" section. In some embodiments, this step is performed when application composition tool 200 is compiled (or, more generally, is generated).

At 302, for the selected user interface artifact, one or more applicable user interface aspects are determined, including by determining which of the one or more ingested lists of applicable user interface artifacts includes the selected user interface artifact. In one example, step 302 is triggered when step 100 in FIG. 1 is performed (e.g., because until that step, the process of FIG. 3 does not know what the selected user interface artifact will be). In other words, step 302 examines the ingested lists and determine which aspects/lists include the selected user interface artifact. Those aspects/lists which include the selected user interface artifact comprise the applicable user interface aspects.

At 304, the applicable user interface aspects is displayed as the set of user interface aspects from which the selected user interface aspect is selected. In some examples described below, an application composition tool has some aspects window, page or tab in which the relevant aspects for the currently selected artifact are displayed. A user (e.g., the modified user interface designer 220 in FIG. 2) can then select which aspects to apply to the currently selected artifact (if desired). Naturally, the display of applicable aspects changes if a different artifact is selected.

The following figure shows some examples of initial user interfaces and modified user interfaces which show how an initial user interface may be modified by one or more aspects.

Figure 4:
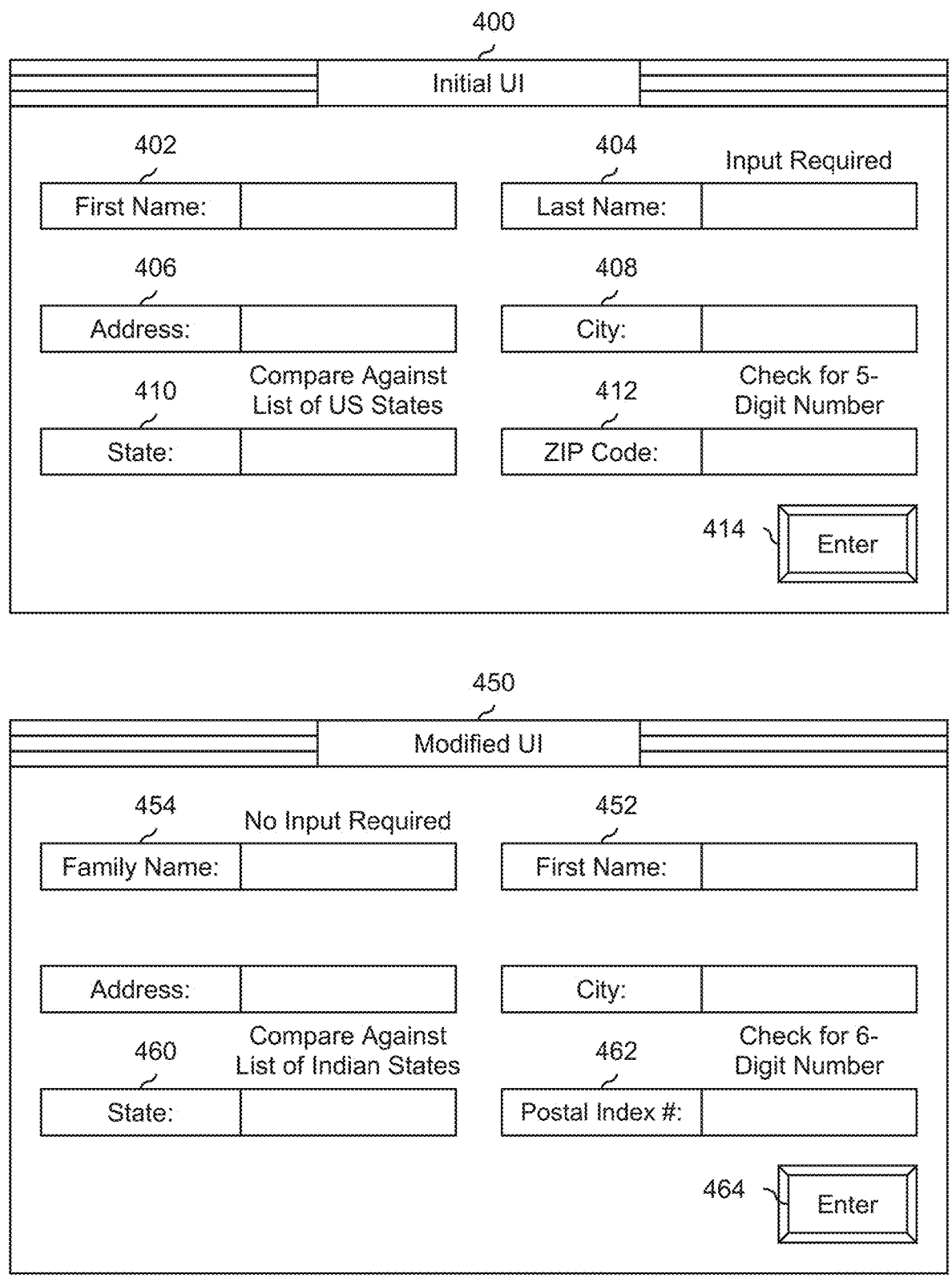
FIG. 4 is a diagram illustrating an embodiment of an initial user interface and a modified user interface associated with creating an object for a person in an enterprise content management system.

FIG. 4 is a diagram illustrating an embodiment of an initial user interface and a modified user interface associated with creating an object for a person in an enterprise content management system. In the example shown, initial user interface 400 includes a number of text input widgets (i.e., first name widget 402, last name widget 404, address widget 406, city widget 408, state widget 410, and ZIP code widget 412) and an actionable widget (i.e., enter button 414). An end user of initial user interface would enter the specified information in text input widgets 402-412 and then press enter button 414. In response to enter button 414 being pushed, initial user interface 400 performs a number of checks: (1) that a last name is provided in last name widget 404, (2) that the state entered in state widget 410 matches one from a list of US states, and (3) that a 5-digit number is entered in ZIP code widget.

Modified user interface 450 is an example of a modified user interface which is generated using one or more selected artifacts and one or more selected aspects. In this example, modified user interface 450 has been modified for use in India.

One change to modified user interface 450 is in the layout or placement of text input widgets. In initial user interface 400, first name widget 402 is in the upper left corner and last name widget 404 is in the upper right corner. In modified user interface 450, their positions have been reversed: family name widget 454 is in the upper left corner and first name widget 452 is in the upper right corner. For example, there is may be a "dynamic placement" aspect and a designer applied that aspect to artifacts associated with first name widget 402 and last name widget 404. As part of the process, the designer may have had to specify the new positions of the text input widgets.

Another change to modified user interface 450 is in the label displayed by family name widget 454. Instead of displaying "Last Name:" (which widget 404 in initial user interface 400 does), widget 454 displays "Family Name:" (e.g., because in India the term "family name" is more common than the term "last name"). As part of the process, the designer may have had to specify the new text (i.e., "Family Name:").

Modified user interface 450 also differs from initial user interface 400 in the checks (or, more generally, actions) that are performed when enter button 464 is pressed. In initial user interface 400, an input is required for last name widget 404. However, in India, some people do not have last/family names. As such, no input is required for family name widget 454. For state widget 460, the input is compared a list of Indian states (as opposed to a list of US states). For postal index number widget 462, modified user interface 450 checks for a 6-digit number (as opposed to a 5-digit number) since postal index numbers in India have 6 digits. In some embodiments, a single "dynamic validation" aspect may have been used but with different artifacts (e.g., text input widgets) selected and different new checks specified for each selected artifact.

As is illustrated in this example, another benefit to the technique is that there is no "code fork" required to simultaneously support multiple versions of a user interface. As is shown in this example, a company may want to have one user interface for one country and another user interface for another county. Both user interfaces would be in use at the same time where the Indian version does not supersede or otherwise replace the US version and vice versa. Since both versions come from the same code base (i.e., the same set of artifacts), there is no code fork.

The following figure shows another example of a modified user interface and corresponding initial user interface.

Figure 5:
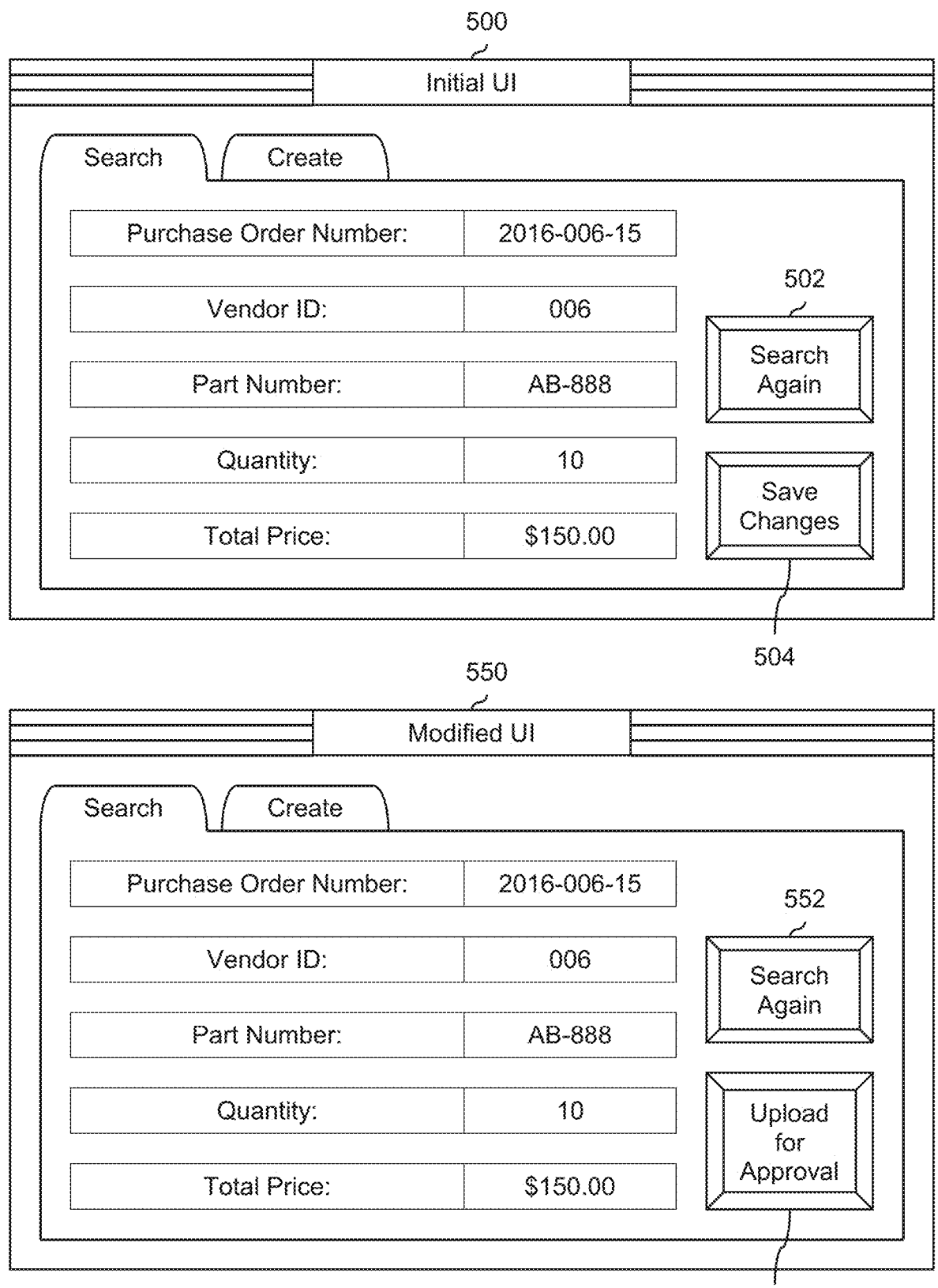
FIG. 5 is a diagram illustrating an embodiment of an initial user interface and a modified user interface associated with searching for and modifying (if desired) purchase order information in an enterprise content management system.

FIG. 5 is a diagram illustrating an embodiment of an initial user interface and a modified user interface associated with searching for and modifying (if desired) purchase order information in an enterprise content management system. In the example shown, initial user interface 500 includes two tabs: search tab and create tab. With the search tab selected, a user can search for purchase orders using one or more of the following search fields: a purchase order number, a vendor ID, or a part number. In the state shown, initial user interface 500 has returned the following purchase order information in response to the search (not shown): a purchase order number of 2016-006-15, a vendor ID of 006, a part number of AB-888, a quantity of 10, and a total price of $150.00.

Initial user interface 550 also includes two buttons: search again button 502 and save changes button 504. If desired, the user can change one or more of the search fields (e.g., the purchase order number, the vendor ID, and/or the part number) and perform another search by pressing search again button 502. If desired, the user can make changes to the purchase order information (e.g., the purchase order number, the vendor ID, the part number, the quantity, and/or the price) and save the changed information to the enterprise content management system.

In this example, a change to the business process is desired where another person is required to validate and/or authorize any changes to the purchase order. In contrast, any changes made using the save changes button in the initial user interface are committed immediately to the enterprise content management system, overwriting or otherwise replacing the old values.

To implement this new feature, a number of aspects are used. First, a dynamic label aspect is used to change the label of save changes button (504) from "Save Changes" to "Upload for Approval" in button 554. Second, an aspect which changes the size or dimensions of button 504 is used to adjust the size of button 554 so that it is taller than button 504 (e.g., in order to clearly display the new, longer label). Third, an aspect which adjusts the position or placement of search again button 552 within the page (fragment) is used so that the button is shifted up (e.g., to accommodate the taller button 554).

It is noted that the second and third aspects/steps outlined above are performed if needed depending upon the implementation. For example, if the implementation of a button and/or the dynamic label aspect is such that the size or dimensions of the button being changed automatically expands to accommodate the longer label, then it may not be necessary to use a change size aspect on button 552. Similarly, if the implementation of a button and/or the dynamic label aspect is such that the position of a neighboring button is automatically shifted, then it may not be necessary to use a change position aspect to manually and/or directly shift button 552 upwards.

Lastly, a change action aspect is used so that the action triggered by pressing button 554 no longer automatically saves the changed data to an enterprise content management system in a manner that overwrites the old data. Rather, the data is (as an example) saved temporarily without overwriting the old data. Some other user (e.g., with the appropriate authority to permit changes to be made to purchase order information) is then notified of the desired change to the purchase order information and either accepts the change (in which case the new data replaces the old data in the enterprise content management system) or denies the change (in which case the proposed change is discarded from the enterprise content management system).

The following figures show some examples of an application composition tool via which an artifact and an aspect are selected (see, e.g., steps 100 and 102 in FIG. 1).

Figure 6:
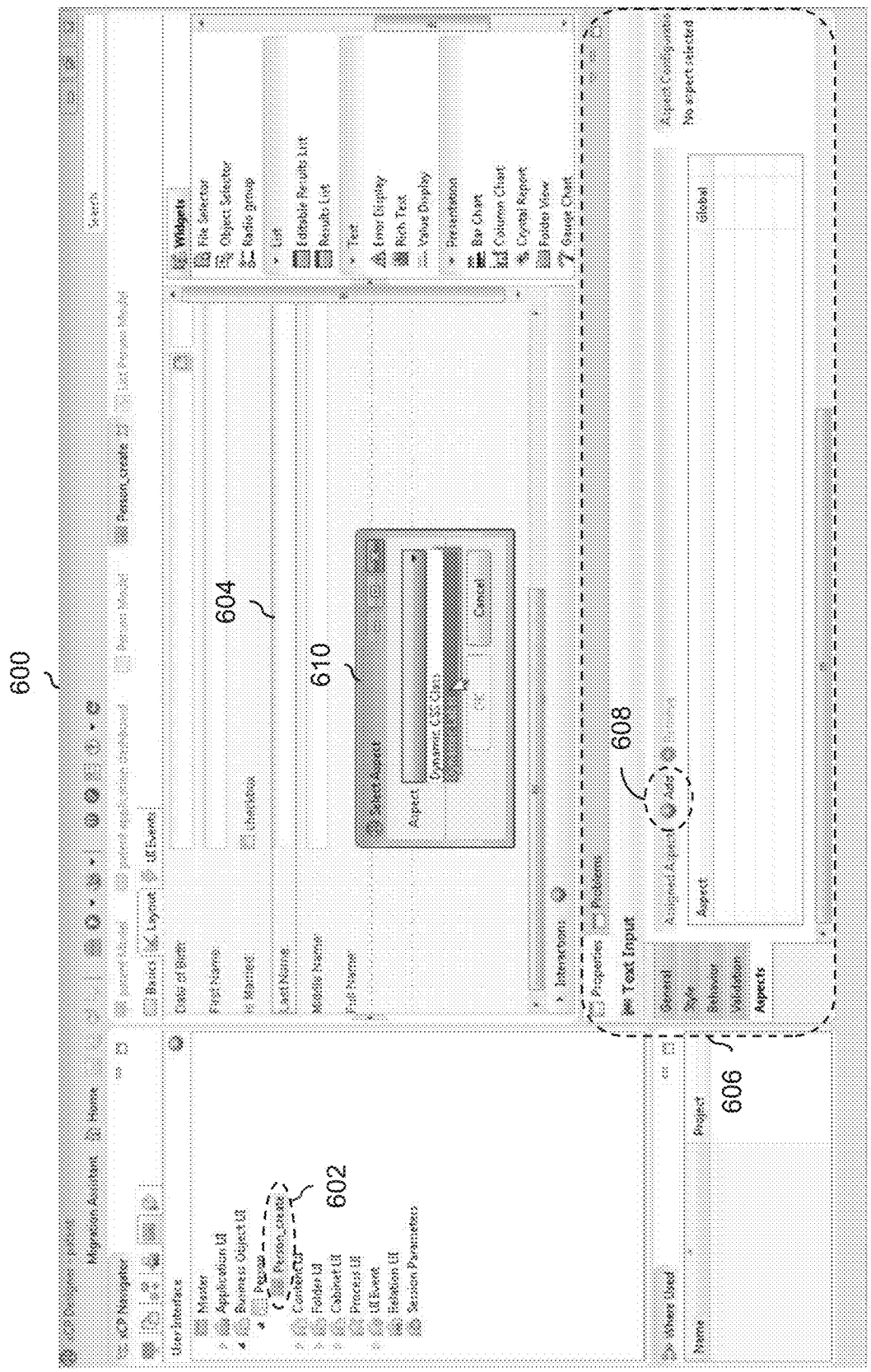
FIG. 6 is a diagram illustrating an embodiment of an application composition tool in which aspects associated with a last name widget are presented and one of the aspects is selected.

FIG. 6 is a diagram illustrating an embodiment of an application composition tool in which aspects associated with a last name widget are presented and one of the aspects is selected. In the example shown, application 600 is an application composition tool, in this case EMC xCP Designer. In the state shown, a person create page (602) associated with creating a business object (e.g., in the enterprise content management system) for a person is being edited. Page 602 includes a number of text input widgets (e.g., first name widget, last name widget, and middle name widget), a date input widget (e.g., date of birth widget), and a Boolean input widget (e.g., is married widget).

Last name widget 604 is selected and as such, the properties displayed in properties panel 606 show the properties for last name widget 604. Last name widget 604 includes a number of properties, including general, style, behavior, validation, and aspects. In the state shown, aspects are selected in properties panel 606 and the aspects assigned to the last name widget (currently none) are shown under "Assigned Aspects."

To add an aspect, a user clicks on add button 608 which causes select aspect window 610 to be displayed. In this example, the user selects the dynamic label aspect from the pull down menu and presses the okay button. The process of FIG. 3 may be used to populate the aspects which are displayed in window 610.

The following figure shows the application composition tool after the dynamic label aspect has been added or otherwise applied to the last name widget.

Figure 7:
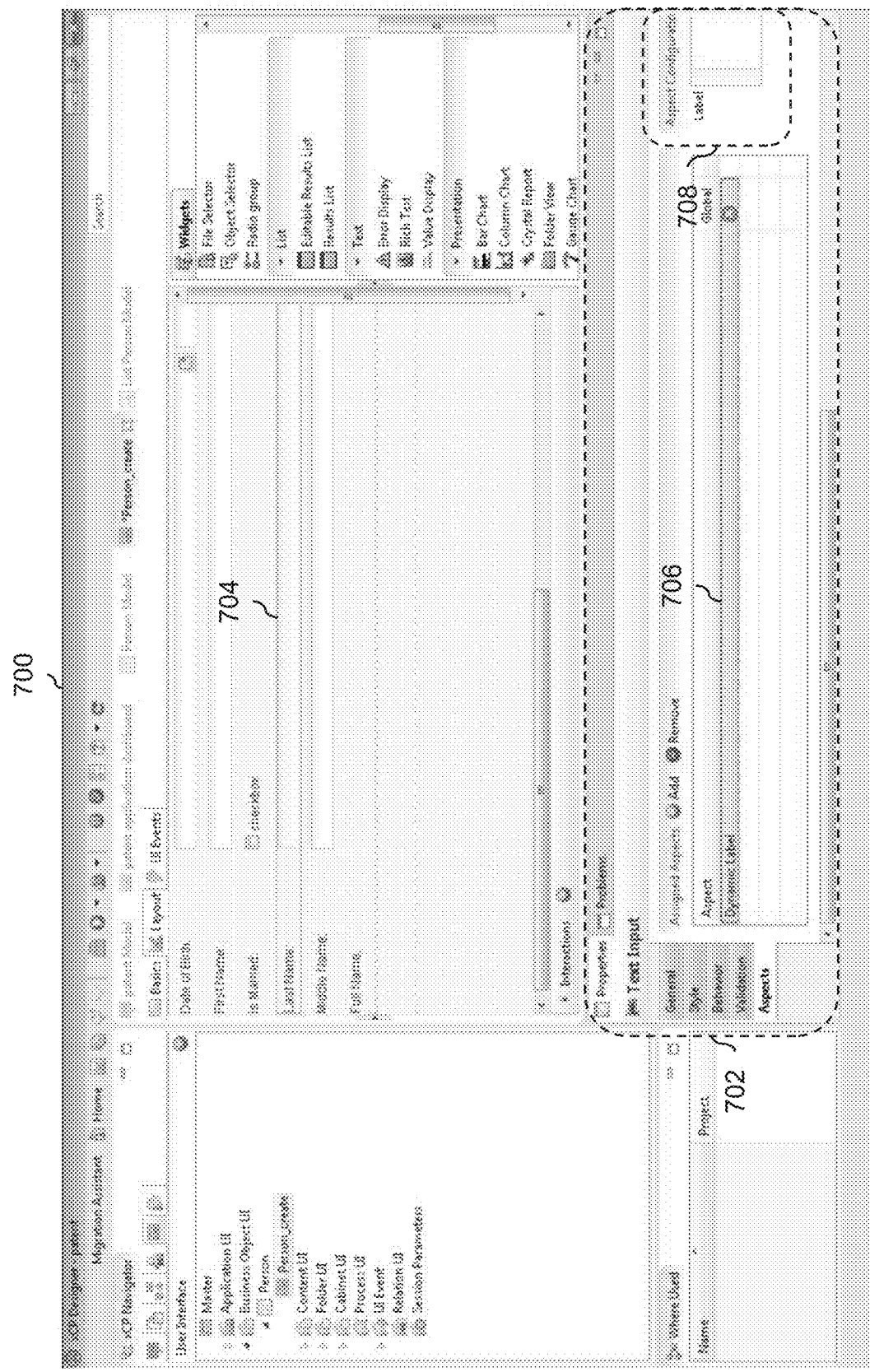
FIG. 7 is a diagram illustrating an embodiment of an application composition tool in which a dynamic label aspect has been applied to a last name widget.

FIG. 7 is a diagram illustrating an embodiment of an application composition tool in which a dynamic label aspect has been applied to a last name widget. Application composition tool 700 in FIG. 7 corresponds to application composition tool 600 from FIG. 6 after dynamic label aspect has been applied to the last name widget.

As is shown in properties panel 702, the assigned aspects for the last name widget (704) now includes the dynamic label aspect. Since dynamic label aspect 706 is selected (note, for example, the highlight over dynamic label aspect 706), aspects configuration panel 708 shows the configurations for dynamic label aspect 706. In this example, the next label (i.e., new text) needs to be configured (i.e., the user needs to specify what the new label for last name label 704 will be). For example, if the user wants to change the label of last name label 704 from "Last Name:" to "Family Name:" then the user would specify "Family Name:" in aspects configuration panel 708 and that new label would be displayed for that widget.

Returning to FIG. 6, it is noted that select aspect window 610 also includes a dynamic CSS class aspect. In some cases, a user may wish to modify the last name widget using both the dynamic label aspect and the dynamic CSS class aspect. If so, properties panel 702 in FIG. 7 would include both aspects and the configurations displayed by aspects configuration panel 708 would correspond to whichever aspect is selected in properties panel 702. For example, if the dynamic CSS class aspect were selected in properties panel 702, then the aspects configuration panel 708 would include a field for the user to specify the new CSS class.

As described above, in some embodiments, an aspect includes a conditional expression. To illustrate this with the dynamic label aspect, a user may specify in aspect configuration panel 708 "IF<conditional expression> THEN <first label value> ELSE <second label value>." In some embodiments, the second label value in the ELSE branch above is the original label for that widget.

The following figures show some other properties associated with the exemplary last name widget described above (see, e.g., the other tabs in property panel 702). Naturally, there may be a corresponding aspect which is capable of modifying one or more of the exemplary properties described below.

Figure 8:
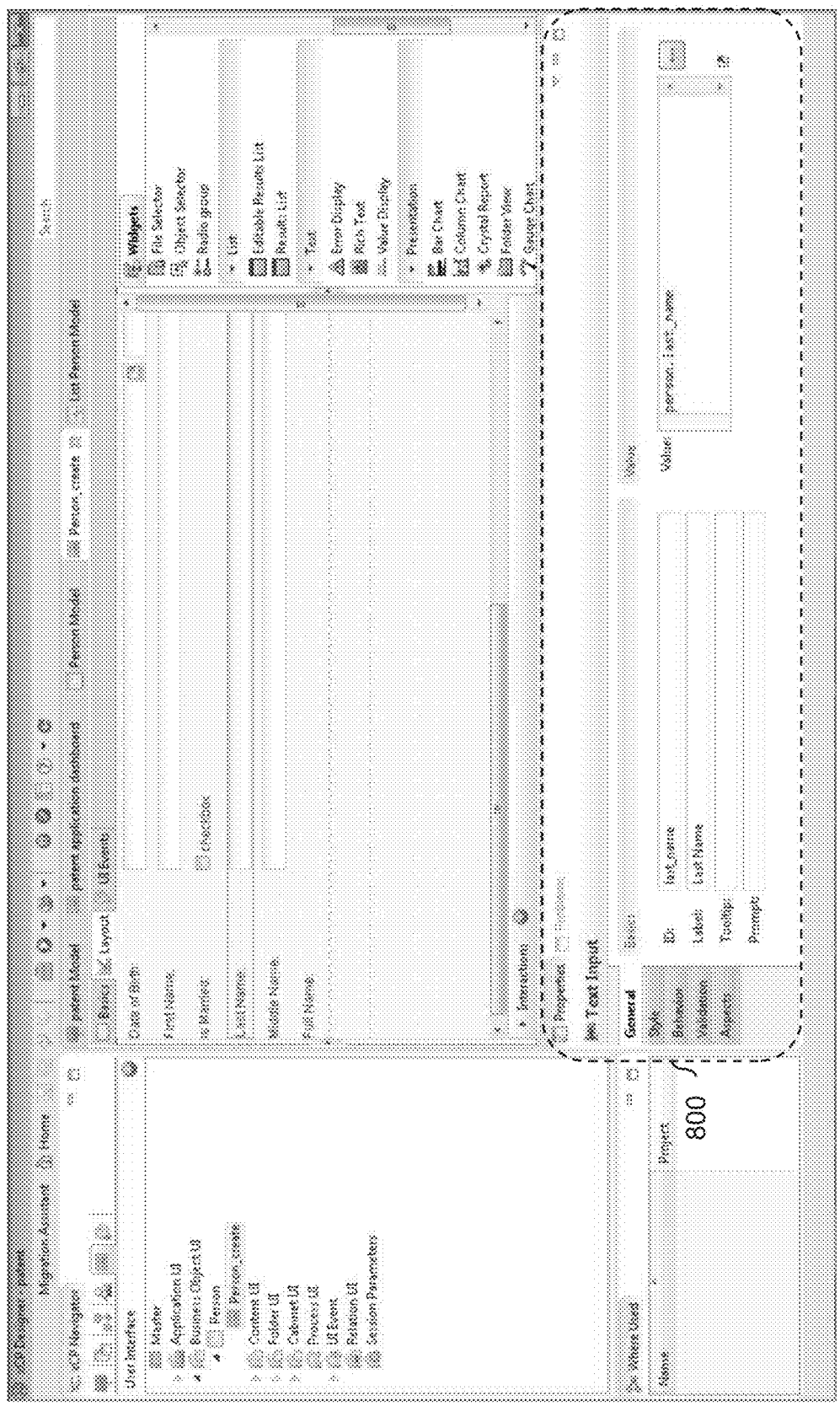
FIG. 8 is a diagram illustrating an embodiment of an application composition tool with general properties displayed for a last name widget.

FIG. 8 is a diagram illustrating an embodiment of an application composition tool with general properties displayed for a last name widget. In the example shown, properties panel 800 shows the general properties of the last name widget and they include an ID, a label, a tooltip, a prompt, and a value (e.g., where the value is stored in the enterprise content management system). As described above, there may exist an aspect which (if desired) modifies any of the general properties shown here.

Figure 9:
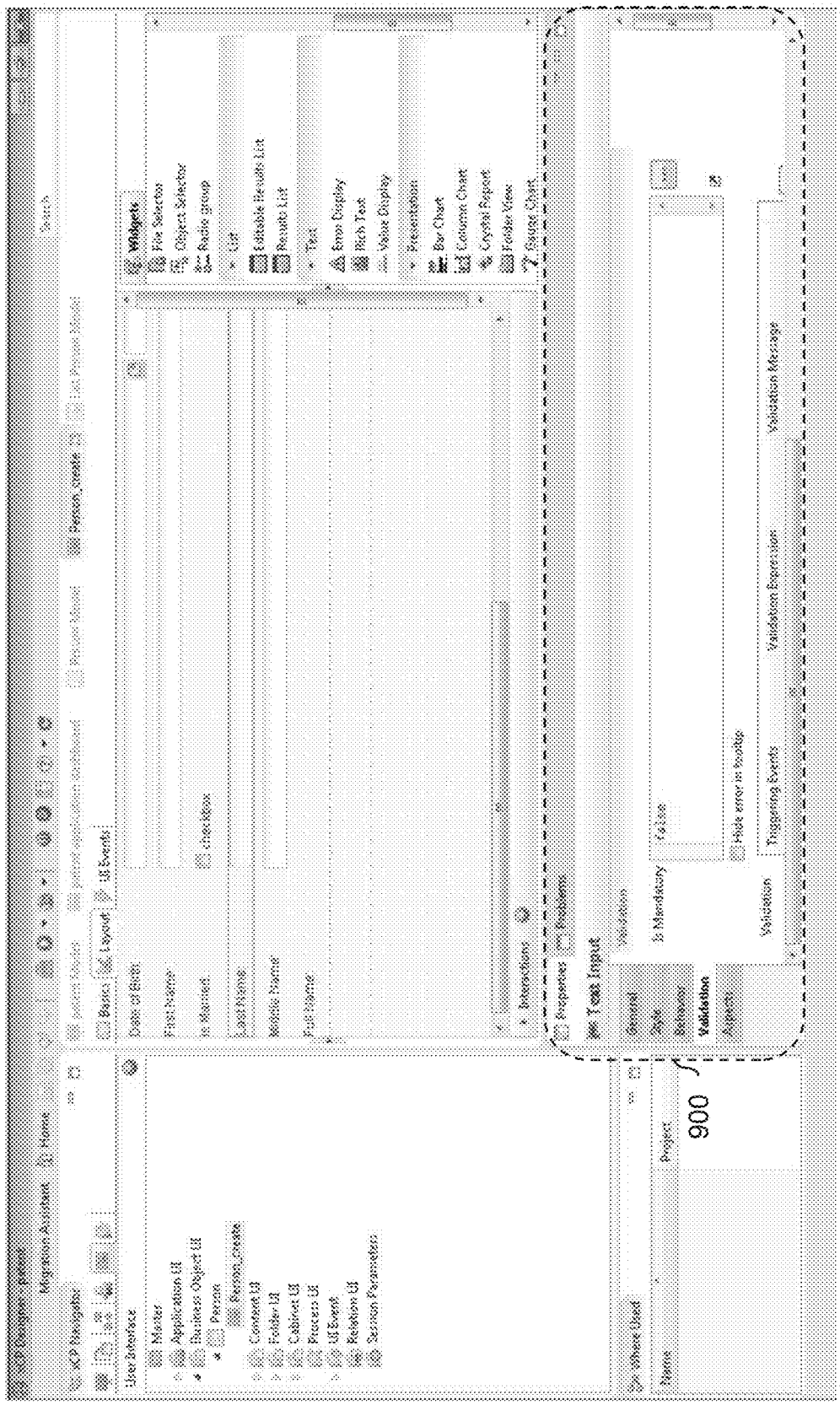
FIG. 9 is a diagram illustrating an embodiment of an application composition tool with validation properties displayed for a last name widget.

FIG. 9 is a diagram illustrating an embodiment of an application composition tool with validation properties displayed for a last name widget. In the example shown, properties panel 900 shows the validation properties for the last name widget (e.g., what check(s) is/are performed on the data that is input into the last name widget and other validation related configurations or settings). This includes whether the validation is mandatory (e.g., a Boolean), whether to hide an error in a tooltip, trigger event(s), validation expression(s), and validation message(s). As described above, there may exist an aspect which (if desired) modifies the validation for a selected artifact. For example, an aspect may modify whether validation is mandatory, whether an error is hidden in a tooltip, the triggering event, the validation expression, and/or the validation message.

The following figures show the exemplary dynamic label aspect in more detail.

Figure 10:
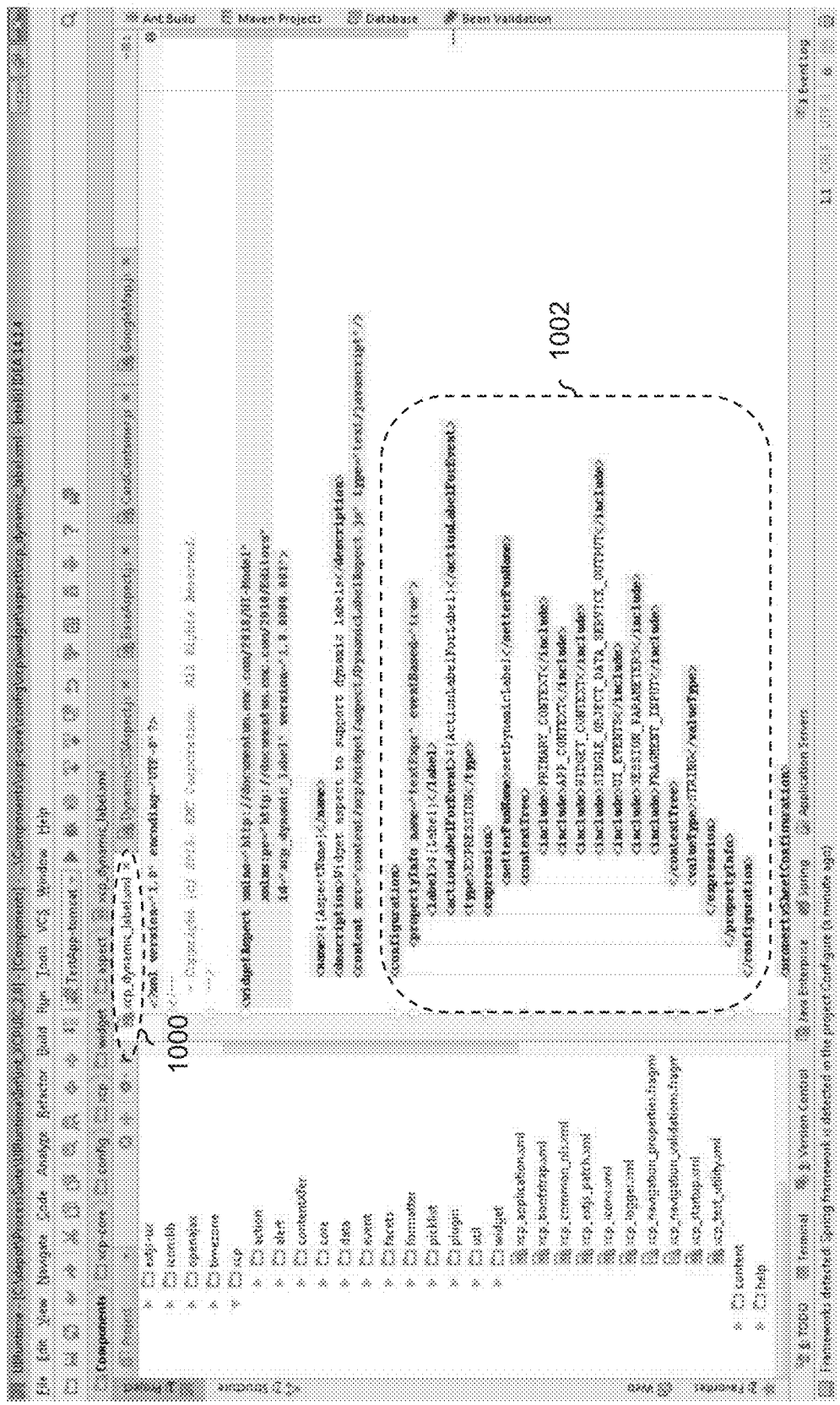
FIG. 10 is a diagram illustrating an embodiment of a dynamic label aspect, including a configuration section.

FIG. 10 is a diagram illustrating an embodiment of a dynamic label aspect, including a configuration section. In the example shown, xcp_dynamic_label.xml 1000 is displayed, including a configuration section (1002). Generally speaking, the configuration section helps an application composition tool (e.g., xCP Designer) display appropriate user interface for the aspect in an aspects tab (e.g., with the application composition tool) and enable an end user to provide any required inputs for the aspect execution in or at runtime.

Figure 11:
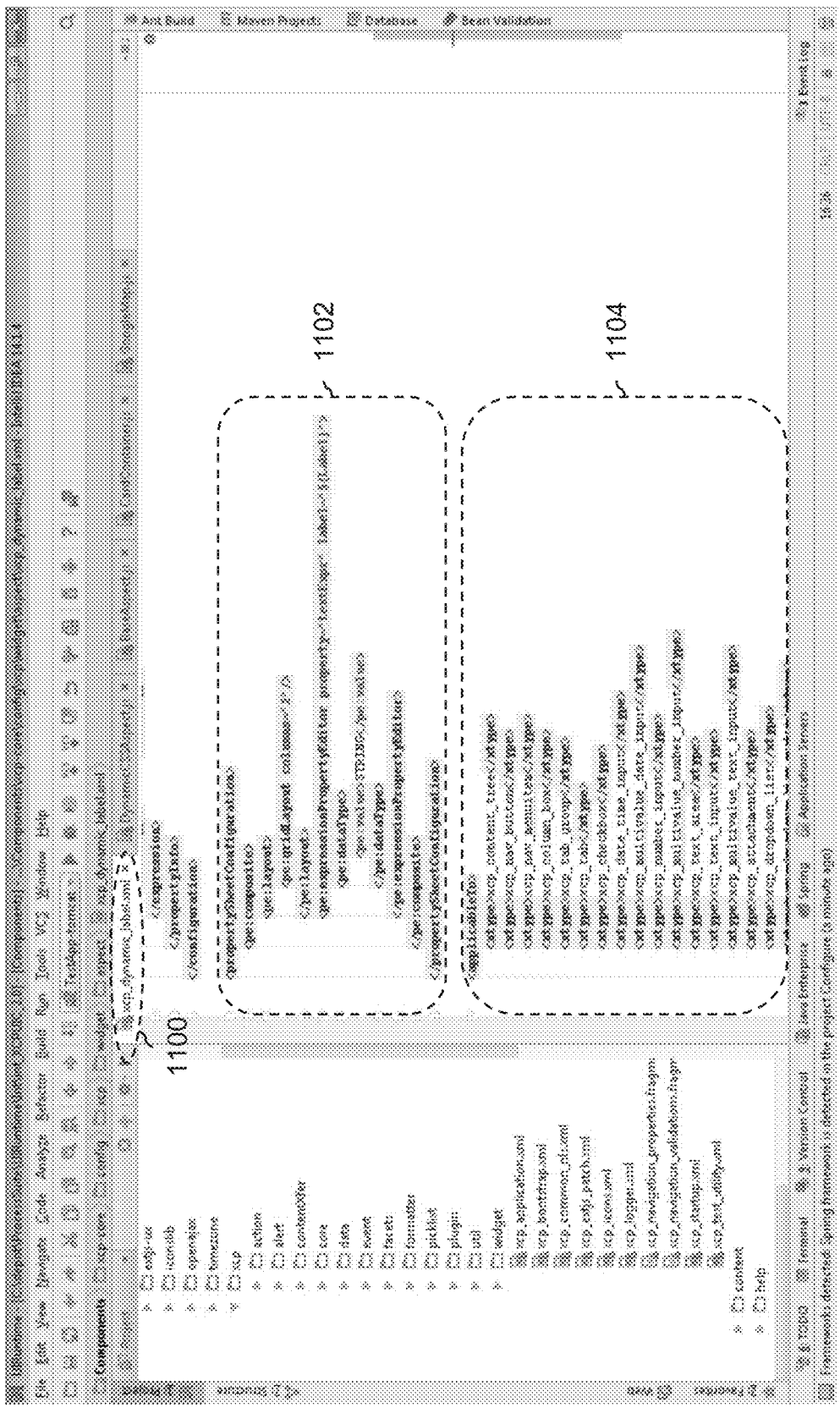
FIG. 11 is a diagram illustrating an embodiment of a dynamic label aspect, including a property sheet configuration section and an applicable to section.

FIG. 11 is a diagram illustrating an embodiment of a dynamic label aspect, including a property sheet configuration section and an applicable to section. FIG. 11 continues the example of FIG. 10 and shows parts of xcp_dynamic_label.xml which were not visible in FIG. 10. In this view, xcp_dynamic_label.xml is shown to include a property sheet configuration section (1102). Generally speaking, the property sheet configuration allows an aspect developer to specify those user interface artifacts this aspect can be attached to. For example, dynamic label aspect (shown here) is applicable to all user interface artifacts which have a label associated with it (see, e.g., line 6 in property sheet configuration section 1102).

This view also include an applicable to section (1104) which describes those artifact types which the aspect is applicable to and is able to modify if so desired. In this example, the applicable artifacts are described by (e.g., logical) artifact type as opposed to specific artifact instances, such that an aspect is applicable to all instances of an artifact when included in the applicable to list. As described above, limiting an aspect to specified artifacts may be desirable to prevent the accidental and/or unintentional violation of some business process or rule enforced by a user interface.

The following figures describe various user interface artifacts in more detail. Although not explicitly shown, it is to be understood that there may be some aspect which is capable of modifying some part of these exemplary artifacts.

User Interface Widgets

Figure 12:
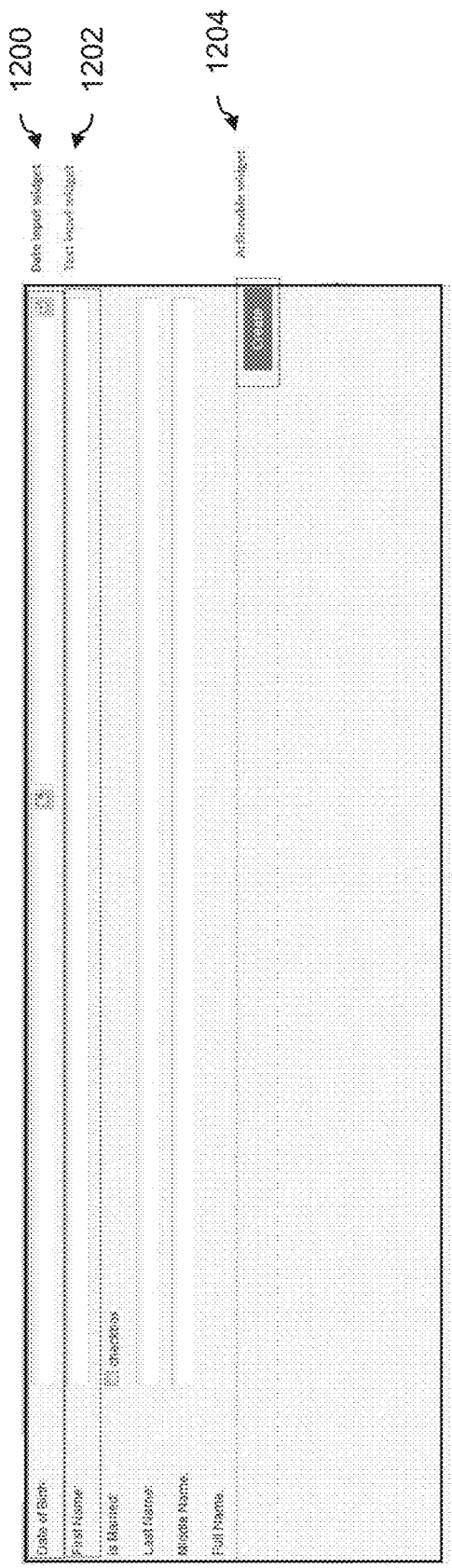
FIG. 12 is a diagram illustrating some embodiments of a user interface widget.

FIG. 12 is a diagram illustrating some embodiments of a user interface widget. A user interface widget is sometimes more simply referred to as a widget. Generally speaking, a widget is an element of a graphical user interface which displays information in some arrangement or layout, such as a column box or a text box, which is configurable by the user. In some application composition tools (e.g., EMC xCP Designer), when building user interface pages, a user can add widgets from a widgets palette onto a layout editor (not shown). This enables the user place them anywhere on the page. The example shown includes a number of widgets, including: a date input widget (1200), a text input widget (1202), and an actionable widget (1204).

Actions

Figure 13:
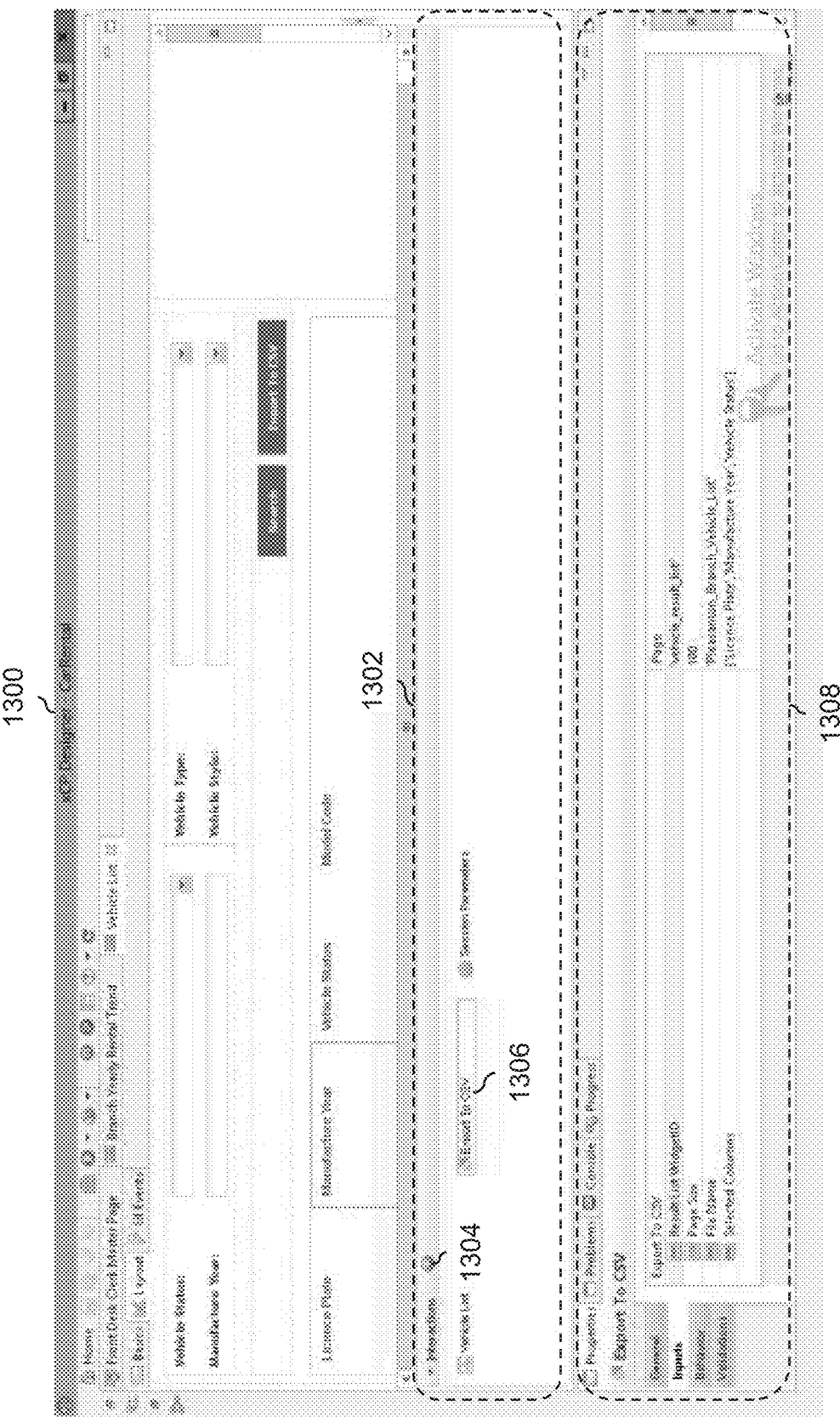
FIG. 13 is a diagram illustrating an embodiment of a user interface for associating a user interface action with a widget and defining that user interface action.

FIG. 13 is a diagram illustrating an embodiment of a user interface for associating a user interface action with a widget and defining that user interface action. (A user interface action is sometimes more simply referred to as an action.) Generally speaking, an action is a piece of code (e.g., faceless code) which gets executed whenever the user performs some specific action. Actions may show up or otherwise be accessible on a page as (for example) a button, link, or context menu. When such user interface elements are clicked, they execute some (as an example) JavaScript. In the context of an enterprise content management system, many user interface actions are used to perform some (business) process, such as: exporting to CSV, printing, adding to a favorite list or as a favorite, logging out, importing a document, exporting a document, checking in a document, checking out a document, deleting a document, completing a task, rejecting a task, or delegating a task.

In the example shown, an application composition tool (1300) shows a vehicle list page being constructed. As is shown in interaction panel 1302, the export to CSV action is currently associated with the vehicle list page. To add another interaction to the vehicle list age, the user interface designer may press add button 1304. In response, application composition tool 1300 may present a pull down window or other widget (not shown) from which to select an action to add to the vehicle list page.

Properties panel 1308 shows some properties associated with the export to CSV action and in the particular state shown shows inputs to the export to CSV action. In this example, the inputs include a result list widget ID (e.g., 'vehicle_result_list'), a page size (e.g., 100), a file name (e.g., 'Pleasanton_Branch_Vehicle_List'), and selected columns (e.g., {'License Plate', 'Manufacturer Year', 'Vehicle Status'}). Other non-input properties in this example include general, behavior, and validations.

User Interface Events

A user interface event is sometimes more simply referred to as an event. Generally speaking, an event is a mechanism which permits a declarative way to express a trigger and/or enable communication between different page elements (e.g., widgets, actions, action flows, data services instances, etc.) without requiring such elements to explicitly register with one another (i.e., be aware of each other).

In one example, a user interface contains two page fragments. One page fragment includes a list of customers and the other page fragment includes details associated with the customers. When a user updates the details of a specific customer, a user interface event occurs and communicates to the first page fragment (with the list of customers), causing that page fragment to update the specifics of that customer to reflect the changes made on the second page fragment. If so configured, an event can trigger multiple events (e.g., based on the configurations set by the user interface designer).

As described above, an event permits decoupling of the source and target information. That means (e.g., irrespective of the source or destination information) the event behaves seamlessly to pass information. An event can also provide an enhanced and interactive user experience where a single event allows interaction between pages. For example, suppose a user interface has a customer accounts page. This page includes a results list widget and an add new customer account button. The results list widget shows details related to customer accounts of interest (e.g., as the result of a search) and the add new customer account button allows a user to add a new customer account. A user (if desired) could use a real-time query (RTQ) to get the details of the customer accounts. Upon clicking the add new customer account button, the user interface would connects the user to the action flow that seeks information through a wizard. For example, the first step seeks information for the type of account, second step seeks information for the name of customer, and the last step is an agreement that the customer accepts to complete the creation of an account. This sequence of steps permits creation of a new customer account. Regardless of the source and target information, a user interface event named account create is configured and this event gets triggered at the last step of the action flow. So, whenever a customer account is added, the user event notifies the user about the addition of a new customer. This event can be used to get the latest list of customers every time a customer is added by the user.

Some examples of user interface events include: object created, page navigated, document imported, user logged in, preferences updated, application started, action flow launched, and key pressed. The following figures show some examples of how events are created and/or managed.

Figure 14:
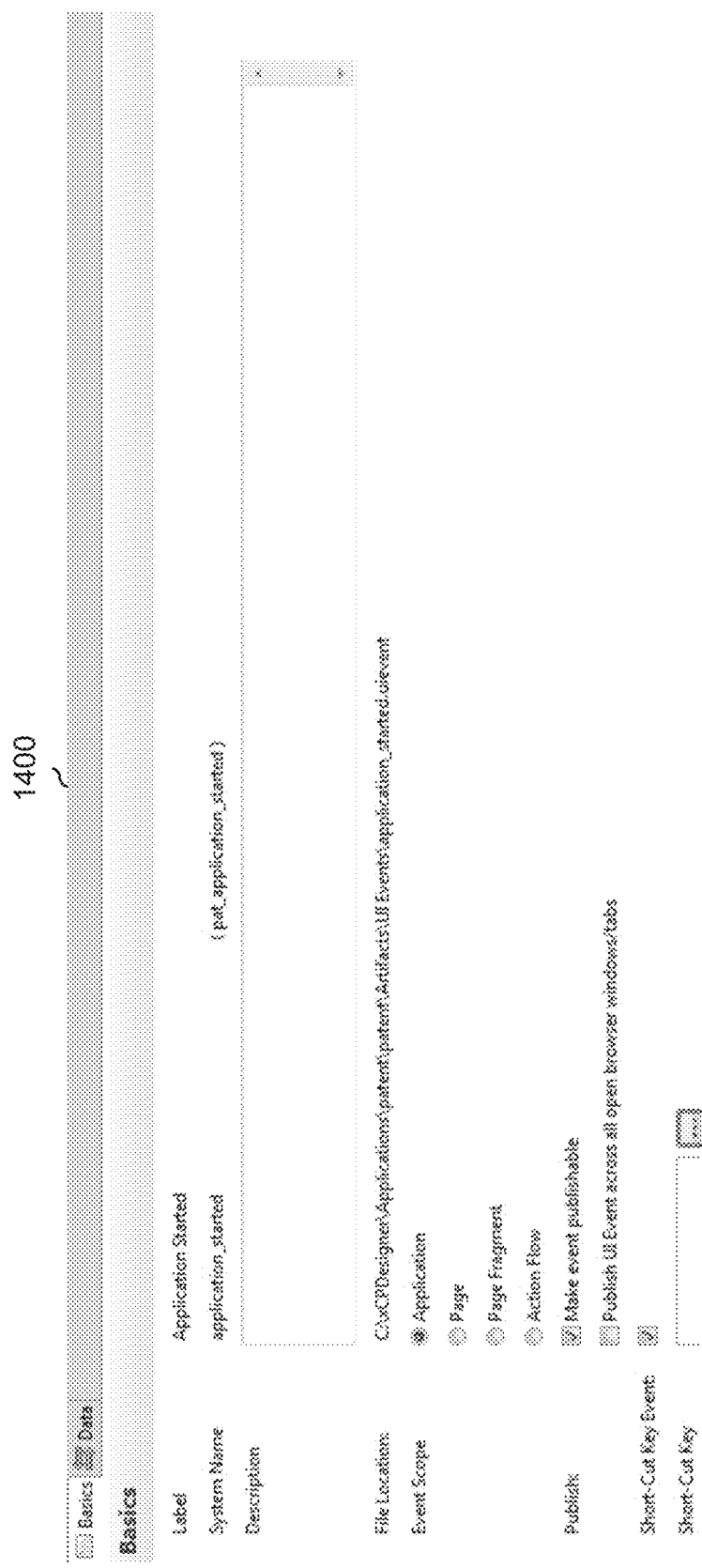
FIG. 14 shows an example of a user interface for defining a new user interface event.

FIG. 14 shows an example of a user interface for defining a new user interface event. In the example shown, user interface 1400 shows the label (e.g., Application Started), system name (e.g., application started), and the file location (e.g., C:\xCPDesigner\Applications\patent\patent\Artifacts\UI Events\application_started.uievent) already defined. User interface 1400 permits a user interface designer to define the event scope (e.g., application, page, page fragment, or action flow), publication settings (e.g., make event publishable and/or publish user interface event across all open browser windows/tabs), whether it is a short-cut key event, and (if so) the short-cut key definition.

Figure 15:
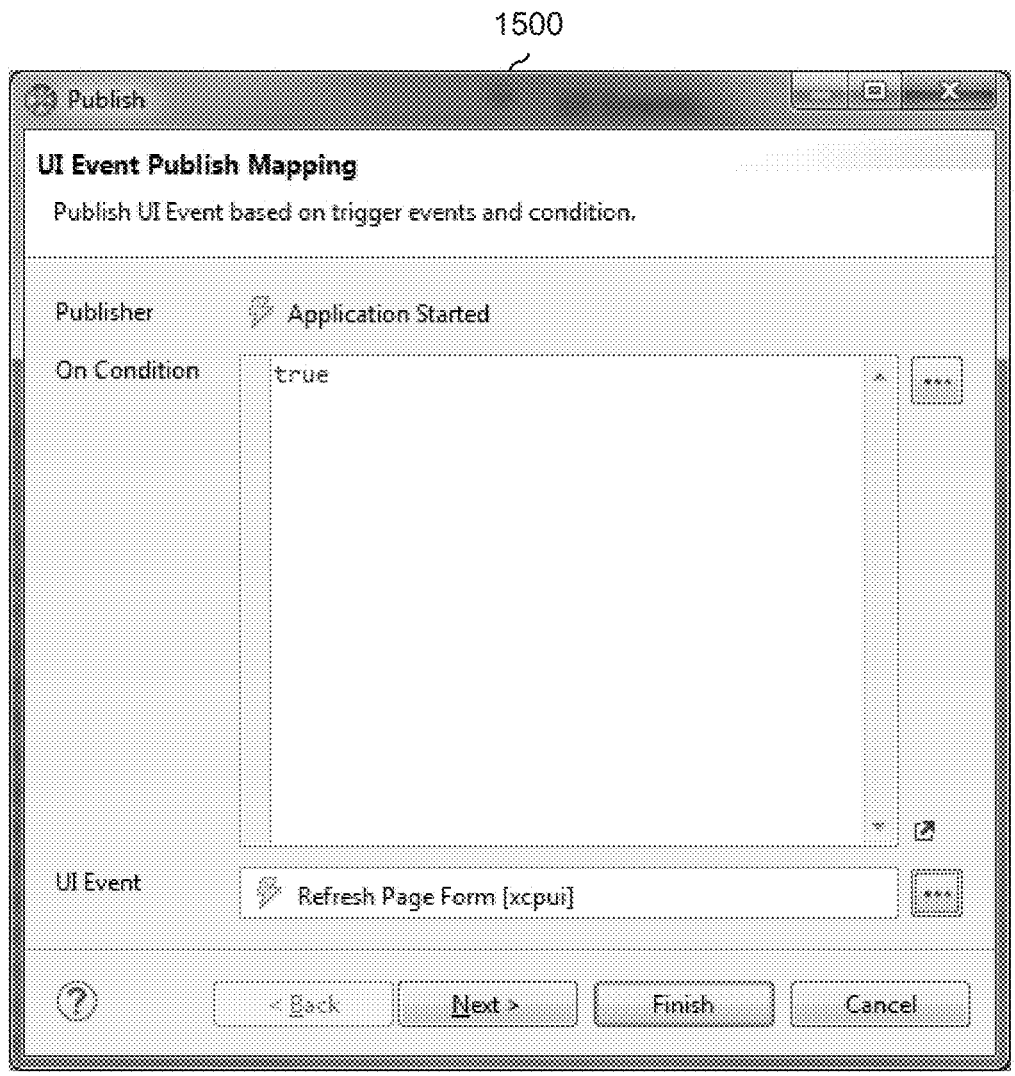
FIG. 15 shows an example of a user interface for publishing a user interface event.

FIG. 15 shows an example of a user interface for publishing a user interface event. In the example shown, user interface 1500 permits a user interface designer to specify a condition (e.g., currently true) and the corresponding event which is published if the condition is true (e.g., refresh page form).

Figure 16:
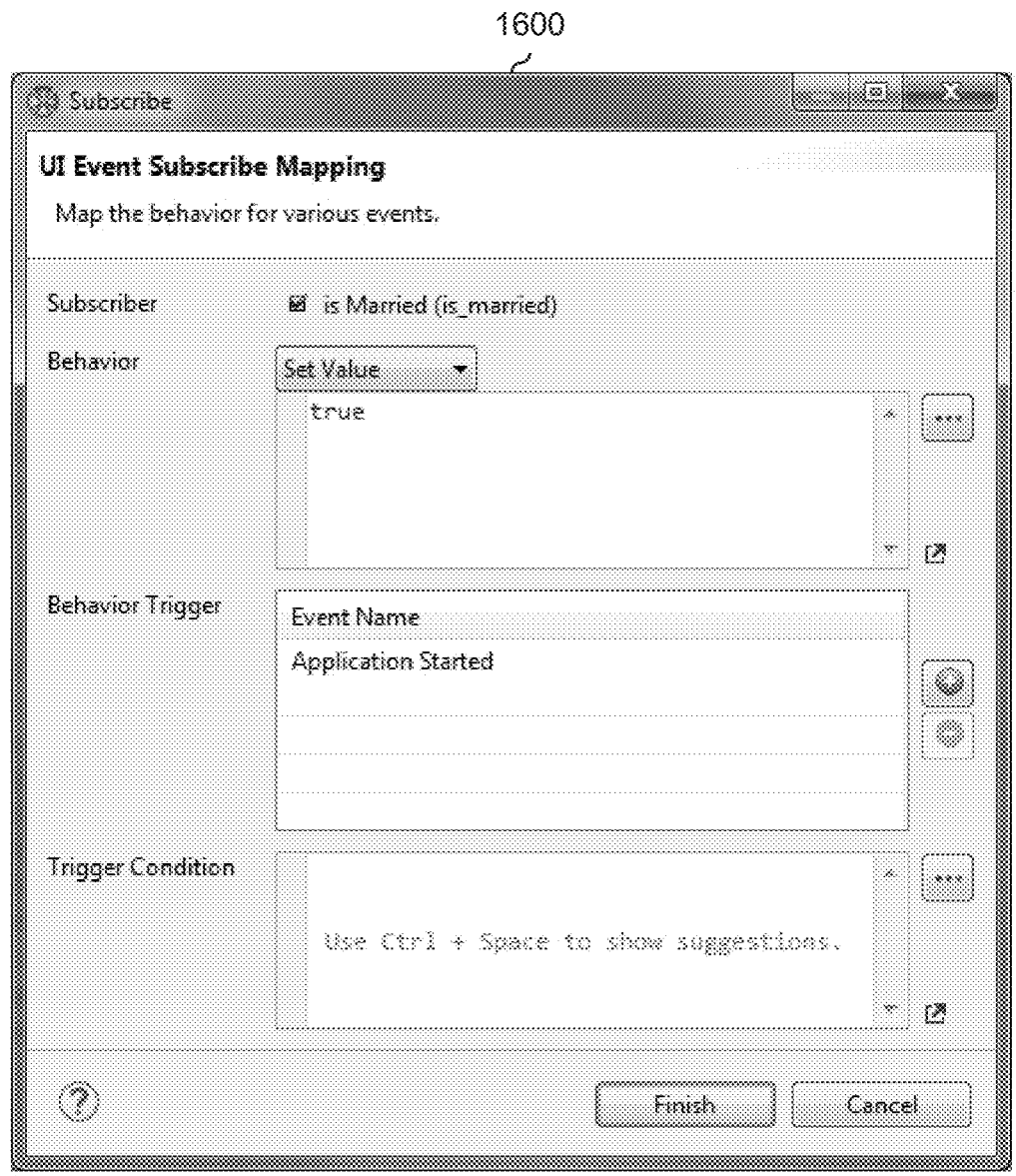
FIG. 16 shows an example of a user interface for subscribing to a user interface event.

FIG. 16 shows an example of a user interface for subscribing to a user interface event. In the example shown, user interface 1600 permits a user interface designer to map the behavior for various events and includes a behavior (e.g., set value to true), a behavior trigger (e.g., application started), and/or a trigger condition.

Context Menus

Figure 17:
FIG. 17 is a diagram illustrating an embodiment of a context menu.

FIG. 17 is a diagram illustrating an embodiment of a context menu. Generally speaking, a context menu is a menu in a user interface which appears in response to some user interaction (e.g., right click a mouse). Context menu 1700 shows one example of a context menu. In some embodiments, the menu which is displayed is context dependent (e.g., depending upon the page, state, location of a pointer, or some other context, a different menu is displayed), hence the name of "context menu."

Page Fragments

Figure 18:
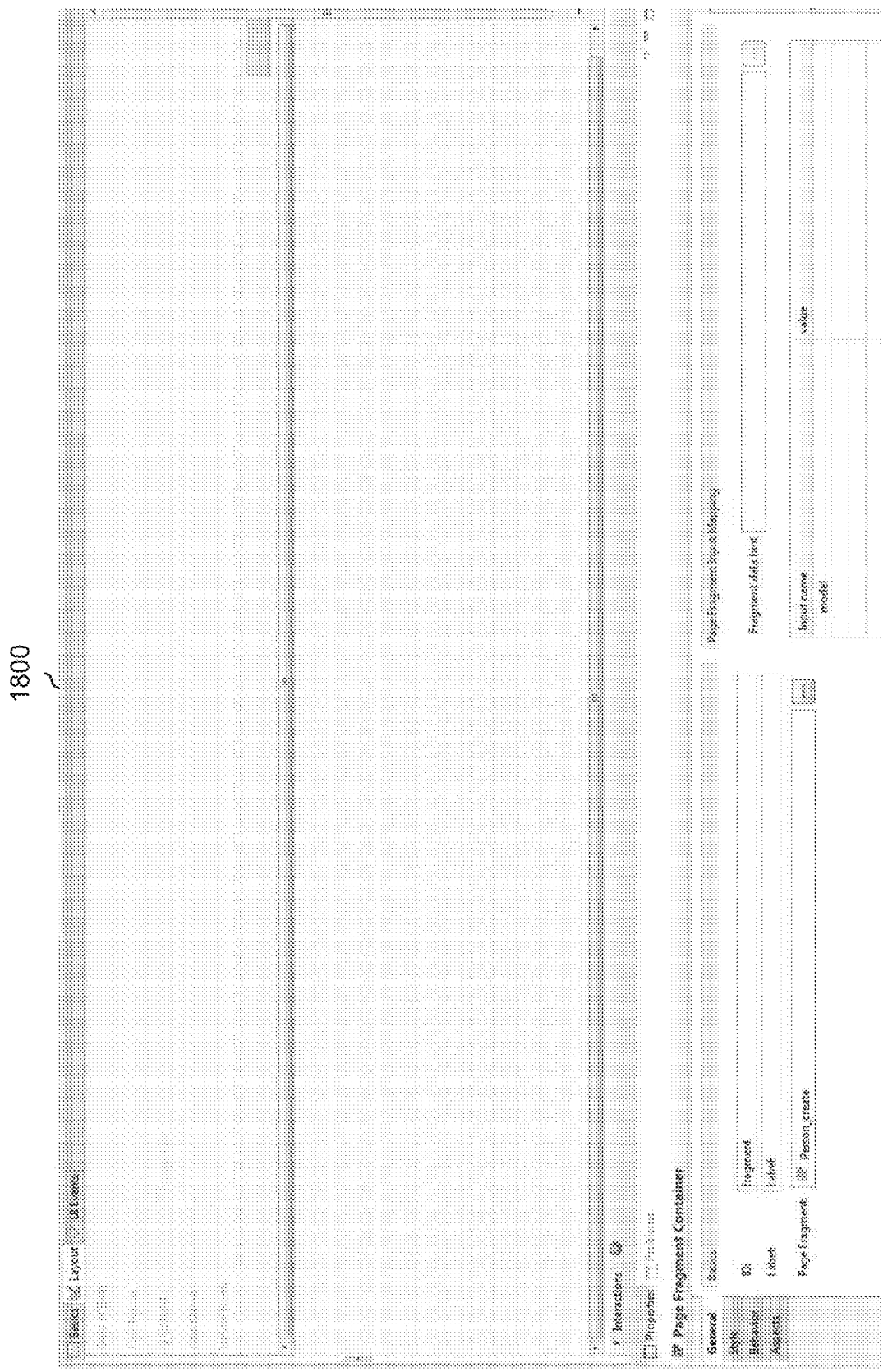
FIG. 18 is a diagram illustrating an embodiment of a user interface for creating a page fragment.

FIG. 18 is a diagram illustrating an embodiment of a user interface for creating a page fragment. User interface 1800 shows an exemplary page fragment being created. Generally speaking, a page fragment is a component that contains a collection of widgets or interactions which an application composer or designer can add to pages or other page fragments. Creating page fragments eliminates the need to add the same widget or widgets to multiple pages in a user interface. For example, in a loan processing application the following six text input widgets may appear together on 12 different pages: customer first name, customer last name, address, city, state, and ZIP code. If application composer did not use a page fragment, the user interface designer would need to add each of these text input widgets to each of the 12 pages. By using a page fragment, the user interface designer can define a collection of text input widgets once, and then reuse the fragment on each page.

A page fragment is like a page in that an application composer associates it to an application or to an object model. Unlike a page, however, a page fragment is not URL addressable and must be added to a page for the runtime application to render it. A page fragment is a self-contained entity that communicates with the host page or fragment by way of input and output parameters.

Action Flows

Generally speaking, an action flow is a reusable sequence of steps that a user performs in a user interface. Some application composition tools can define an action flow and reuse it in multiple contexts. At runtime, the action flow presents users with either a single step or multiple steps to assist them in executing a (e.g., business) task or process. For example, an application composition tool can create an action flow that enables users to add collateral to a customer. The application composition tool can reuse the same action flow in a car loan processing application and in a mortgage application. In various embodiments, an action flow permits a user interface designer to: control the number of steps, sequence the flow of steps, define the final action executed at the end of the flow, enable the finish button to be labeled, define the label for the cancel button, define the visibility of finish and/or cancel buttons, enable or disable the navigation to next and finish step based on the condition, and/or configure the expression to return step pages, first page, or next page.

Figure 19:
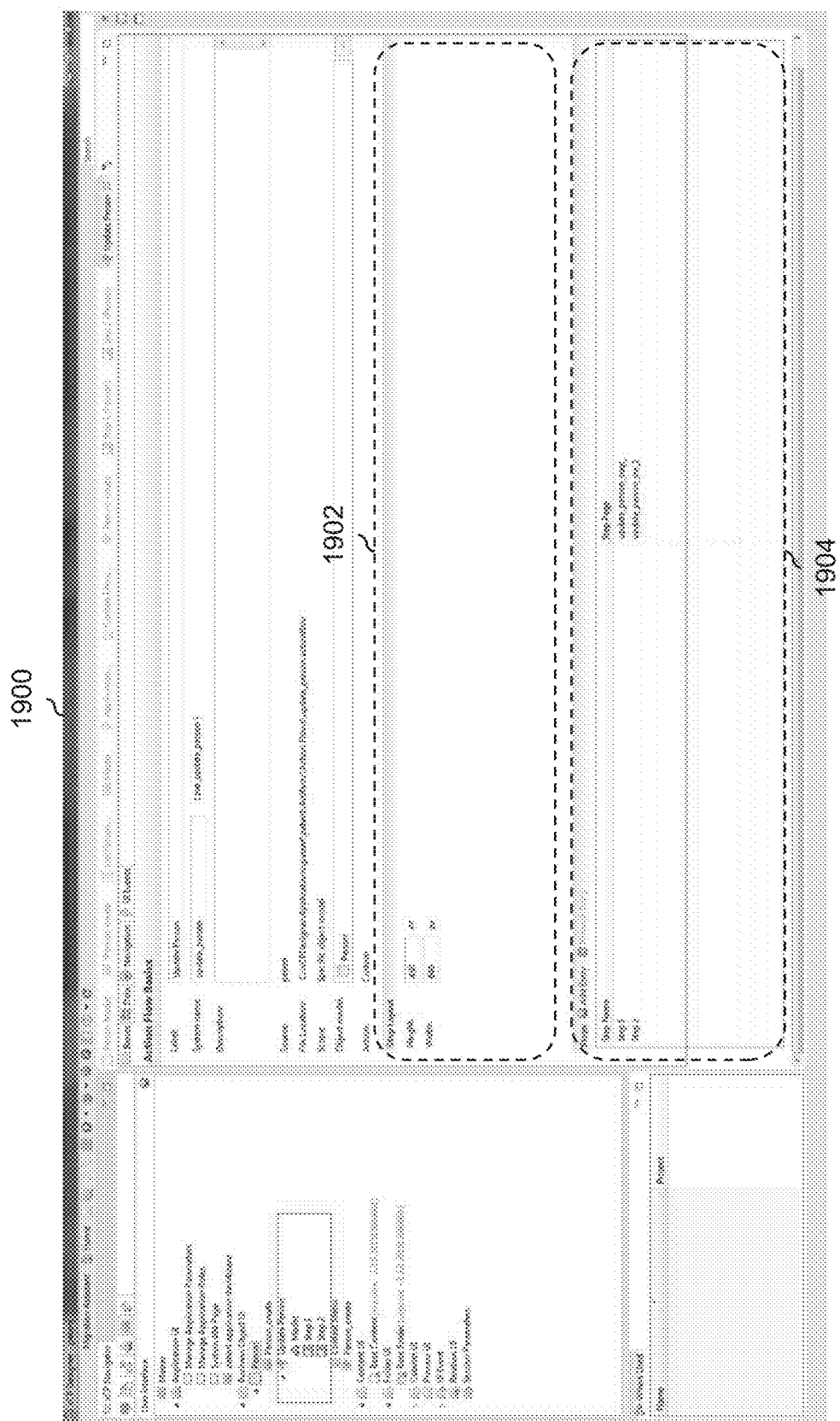
FIG. 19 is a diagram illustrating an embodiment of a user interface for configuring an action flow.

FIG. 19 is a diagram illustrating an embodiment of a user interface for configuring an action flow. In the example shown, user interface 1900 permits a user interface designer to configuring an action flow. This includes step layout section 1902 where the height and width can be specified and steps section 1904 where the various steps can be added.

Pages

Generally speaking, a page is the basic unit of a user interface. Pages are created and composed at design time by putting widgets on it. It is then viewed at runtime with those widgets.

Page types include master pages, applications pages, and instance pages. A master page is a top-most page in the page hierarchy. Typically, a master page has a menus for application level operations, logos, a global search option, etc. A typical master page may also have a designated area to display application or instance pages. An application page is used to display information outside of the context of an instance of any given object. They are typically used as the home page of the application, search pages, list pages and administration pages. An instance page is used to create, display, and/or update data of the associated object type, for example a customer or collateral.

Figure 20:
FIG. 20 is a diagram illustrating an embodiment of a user interface for creating an instance page for editing a person.

FIG. 20 is a diagram illustrating an embodiment of a user interface for creating an instance page for editing a person. In the example shown, the layout of the edit person (instance) page is shown and the user interface designer can change the layout (i.e., placement) of widgets within the (instance) page.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a processor; and
a memory coupled with the processor, wherein the memory is configured to provide the processor with instructions which when executed cause the processor to:
execute an enterprise content management system, including retrieving from a user interface storage a first user interface to an enterprise content management system, wherein the first user interface is in a form which is capable of being executed or run and includes a set of one or more user interface artifacts, and wherein each of the one or more user interface artifacts is a part of the first user interface that defines how the first user interface behaves in response to a user's input and executing the first user interface;

ingest, for each user interface aspect included in a set of one or more user interface aspects, a list of applicable user interface artifacts that are modifiable by the user interface aspect, the list comprising XML code in an applicable to section in the executable code of the user interface aspect;
receive, by the enterprise content management system at runtime, a selection of a user interface artifact from the set of one or more user interface artifacts of the executing first user interface;
determine, for the selected user interface artifact, one or more applicable user interface aspects, including by determining which of the ingested list of applicable user interface artifacts includes the selected user interface artifact;
display the one or more applicable user interface aspects as the set of one or more user interface aspects from which the selected user interface aspect is selected;
receive, by the enterprise content management system at runtime, a selection of a user interface aspect from the set of one or more user interface aspects, wherein each user interface aspect in the set of one or more user interface aspects comprises executable XML code including a configuration section which enables input of information required for execution of the interface aspect and the applicable to section which describes user interface artifacts in the executing first user interface that the interface aspect is capable of modifying; and
at runtime, modify the executing first user interface according to the selected user interface aspect by modifying or replacing JavaScript code of the selected user interface artifact and thereby generate a modified first user interface to the enterprise content management system which is different from the first user interface, including executing the selected user interface artifact in the modified first user interface as modified by the selected user interface aspect, wherein modifying the executing first user interface according to the selected user interface aspect comprises, at runtime, determining that the selected user interface aspect is selected to modify the selected user interface artifact, and executing the code of the selected user interface aspect instead of a corresponding portion of the code of the selected user interface artifact.

2. The system recited in claim 1, wherein the set of one or more user interface artifacts includes one or more of the following: a user interface widget, a date input widget, a text input widget, an actionable widget, an action, a user interface event, a context menu, a page fragment, an action flow, a page, or a step.

3. The system recited in claim 1, wherein the set of one or more user interface artifacts includes a dynamic label aspect associated with changing a label associated with the selected user interface artifact.

4. The system recited in claim 1, wherein the set of one or more user interface artifacts includes a dynamic CSS class aspect associated with changing a CSS class associated with the selected user interface artifact.

5. The system recited in claim 1, wherein generating the modified first user interface to the enterprise content management system comprises examining each of the set of one or more user interface artifacts included in the first user interface, determining whether any of the set of one or more user interface artifacts included in the first user interface is modified by any of the set of one or more user interface aspects, and executing the set of one or more user interface artifacts included in the first user interface as modified by any of the set of one or more user interface aspects.

6. The system recited in claim 1, wherein generating the modified first user interface to the enterprise content management system comprises enforcing in the modified first user interface one or more rules that were associated with the first user interface prior to modifying the selected user interface artifact according to the selected user interface aspect.

7. The system recited in claim 6, wherein the modified first user interface retains at least one of the one or more user interface artifacts included in the first user interface, wherein the at least one of the one or more retained user interface artifacts is unmodified from the first user interface.

8. The system recited in claim 1, wherein executing the code of the selected user interface aspect comprises evaluating a conditional expression at runtime, identifying the code of the selected user interface aspect based on the evaluated conditional expression, and executing the identified code.

9. A method, comprising:
    executing an enterprise content management system application, including retrieving from a user interface storage a first user interface to an enterprise content management system, wherein the first user interface is in a form which is capable of being executed or run and includes a set of one or more user interface artifacts that are parts of the first user interface that define how the first user interface behaves in response to a user's input;
    ingesting, for each user interface aspect included in a set of one or more user interface aspects, a list of applicable user interface artifacts that are modifiable by the user interface aspect, the list comprising XML code in an applicable to section in the executable code of the user interface aspect;
    receiving at runtime a selection of a user interface artifact from the set of one or more user interface artifacts of the first user interface;
    determining, for the selected user interface artifact, one or more applicable user interface aspects, including by determining which of the ingested list of applicable user interface artifacts includes the selected user interface artifact;
    displaying the one or more applicable user interface aspects as the set of one or more user interface aspects from which the selected user interface aspect is selected;
    receiving a selection of a user interface aspect from the set of one or more user interface aspects, wherein each user interface aspect in the set of one or more user interface aspects comprises executable XML code including a configuration section which enables input of information required for execution of the interface aspect and an applicable to section which describes user interface artifacts in the executing first user interface that the interface aspect is capable of modifying; and
    using a processor to modify, at runtime, JavaScript code of the executing first user interface and thereby generate a modified first user interface to the enterprise content management system, including executing the selected user interface artifact in the modified first user interface as modified by the selected user interface aspect, wherein modifying the executing first user interface according to the selected user interface aspect comprises, at runtime, determining that the selected user interface aspect is selected to modify the selected user interface artifact, and executing the code of the selected user interface aspect instead of a corresponding portion of the code of the selected user interface artifact.

10. The method recited in claim 9, wherein the set of one or more user interface artifacts includes one or more of the following: a user interface widget, a date input widget, a text input widget, an actionable widget, an action, a user interface event, a context menu, a page fragment, an action flow, a page, or a step.

11. The method recited in claim 9, wherein the set of one or more user interface artifacts includes a dynamic label aspect associated with changing a label associated with the selected user interface artifact.

12. The method recited in claim 9, wherein the set of one or more user interface artifacts includes a dynamic CSS class aspect associated with changing a CSS class associated with the selected user interface artifact.

13. A computer program product, the computer program product being embodied in a non-transitory computer readable storage medium and comprising computer instructions for:
    executing an enterprise content management system application, including retrieving from a user interface storage a first user interface to an enterprise content management system, wherein the first user interface is in a form which is capable of being executed or run and includes a set of one or more user interface artifacts that are parts of the first user interface that define how the first user interface behaves in response to a user's input;
    ingesting, for each user interface aspect included in a set of one or more user interface aspects, a list of applicable user interface artifacts that are modifiable by the user interface aspect, the list comprising XML code in an applicable to section in the executable code of the user interface aspect;
    receiving at runtime a selection of a user interface artifact from the set of one or more user interface artifacts of the first user interface;
    determining, for the selected user interface artifact, one or more applicable user interface aspects, including by determining which of the ingested list of applicable user interface artifacts includes the selected user interface artifact;
    displaying the one or more applicable user interface aspects as the set of one or more user interface aspects from which the selected user interface aspect is selected;
    receiving a selection of a user interface aspect from the set of one or more user interface aspects, wherein each user interface aspect in the set of one or more user interface aspects comprises executable XML code including a configuration section which enables input of information required for execution of the interface aspect and an applicable to section which describes user interface artifacts in the executing first user interface that the interface aspect is capable of modifying; and
    at runtime, modifying JavaScript code of the executing first user interface and thereby generating a modified first user interface to the enterprise content management system, including executing the selected user interface artifact in the modified first user interface as modified by the selected user interface aspect, wherein modifying the executing first user interface according to the selected user interface aspect comprises, at runtime, determining that the selected user interface aspect is selected to modify the selected user interface artifact, and executing the code of the selected user interface aspect instead of a corresponding portion of the code of the selected user interface artifact.

14. The computer program product recited in claim 13, wherein the set of one or more user interface artifacts includes one or more of the following:

a user interface widget, a date input widget, a text input widget, an actionable widget, an action, a user interface event, a context menu, a page fragment, an action flow, a page, or a step.

15. The computer program product recited in claim 13, wherein the set of one or more user interface artifacts includes a dynamic label aspect associated with changing a label associated with the selected user interface artifact.

16. The computer program product recited in claim 13, wherein the set of one or more user interface artifacts includes a dynamic CSS class aspect associated with changing a CSS class associated with the selected user interface artifact.

* * * * *